(12) United States Patent
Chaudhry et al.

(10) Patent No.: US 6,430,649 B1
(45) Date of Patent: Aug. 6, 2002

(54) METHOD AND APPARATUS FOR ENFORCING MEMORY REFERENCE DEPENDENCIES THROUGH A LOAD STORE UNIT

(75) Inventors: Shailender Chaudhry, San Francisco; Marc Tremblay, Menlo Park; James M. O'Connor, Union City, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/327,398

(22) Filed: Jun. 7, 1999

(51) Int. Cl.$^7$ .................................................. G06F 9/38
(52) U.S. Cl. ......................... 711/100; 712/216; 712/225
(58) Field of Search ................................. 712/216, 218, 712/219, 214, 215, 225; 711/217, 100

(56) References Cited

U.S. PATENT DOCUMENTS 5,613,083 A * 3/1997 Glew et al. .................. 711/207
5,751,983 A * 5/1998 Abramson et al. ........... 712/216
5,854,914 A * 12/1998 Bodas et al. ................. 712/216
5,999,727 A   12/1999 Panwar et al. ............... 395/566

FOREIGN PATENT DOCUMENTS

GB    2 321 544    7/1998
WO    WO 99/31594  6/1999

OTHER PUBLICATIONS

Franklin, et al.; ARB: A Hardware Mechanism for Dynamic Reordering of Memory Reference; Department of Electrical and Computing Engineering Clemson University, Clemson, SC and Computer Sciences Department University of Wisconsin, Madison, WI; pp. 1–28. Date N/A.

* cited by examiner

*Primary Examiner*—Do Hyun Yoo
*Assistant Examiner*—Yamir Encarnacion
(74) *Attorney, Agent, or Firm*—Park, Vaughan & Fleming LLP

(57) ABSTRACT

One embodiment of the present invention provides a system that enforces dependencies between memory references within a load store unit (LSU) in a processor. When a write request is received in the load store unit, the write request is loaded into a store buffer in the LSU. The write request may include a "watch address" specifying that a subsequent load from the watch address cannot occur before the write request completes. Note that the watch address is not necessarily the same as the destination address of the write operation. When a read request is received in the load store unit, the read request is loaded into a load buffer of the LSU. The system determines if the read request is directed to the same address as a matching watch address in the store buffer. If so, the system waits for the write request associated with the matching watch address to complete before completing the read request. In one embodiment of the present invention, if the read request is directed to the same address as a matching write request in the store buffer, the system completes the read request by returning a data value contained in the matching write request without going out to memory. In one embodiment of the present invention, the system provides an executable code write instruction that specifies the watch address.

25 Claims, 9 Drawing Sheets

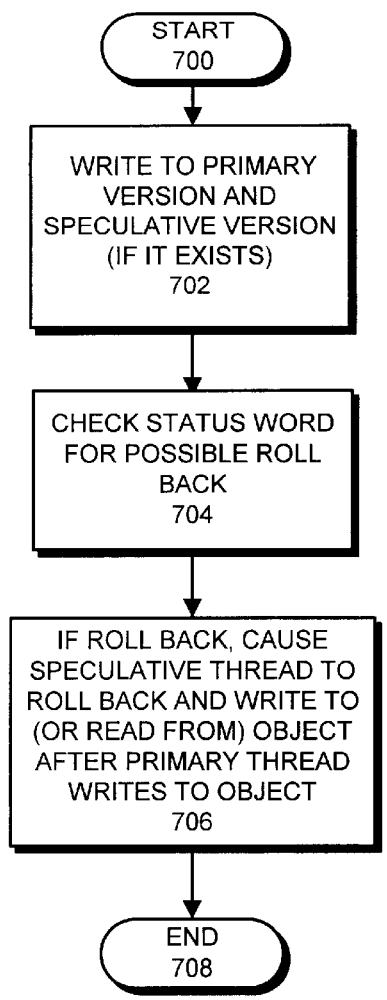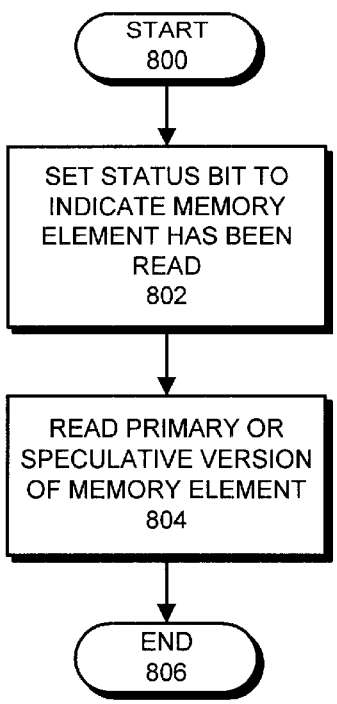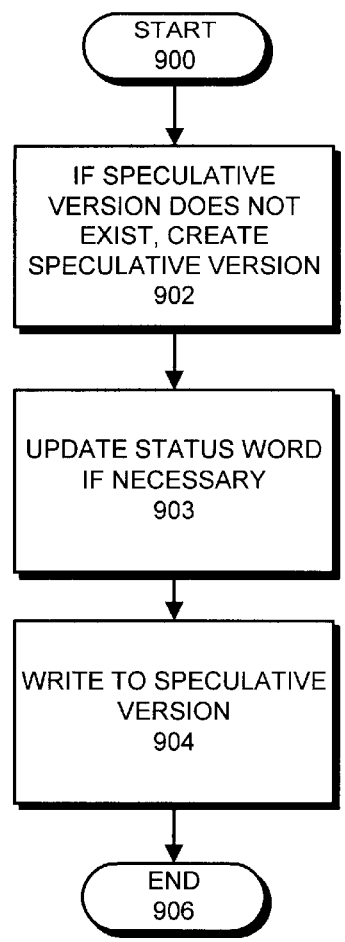
FIG. 7
FIG. 8
FIG. 9

METHOD AND APPARATUS FOR ENFORCING MEMORY REFERENCE DEPENDENCIES THROUGH A LOAD STORE UNIT

BACKGROUND

1. Field of the Invention

The present invention relates to techniques for improving computer system performance. More specifically, the present invention relates to a method and apparatus that enforces dependencies between memory references passing through a load store unit.

2. Related Art

As increasing semiconductor integration densities allow more transistors to be integrated onto a microprocessor chip, computer designers are investigating different methods of using these transistors to increase computer system performance. Some recent computer architectures exploit "instruction level parallelism," in which a single central processing unit (CPU) issues multiple instructions in a single cycle. Given proper compiler support, instruction level parallelism has proven effective at increasing computational performance across a wide range of computational tasks. However, inter-instruction dependencies generally limit the performance gains realized from using instruction level parallelism to a factor of two or three.

Another method for increasing computational speed is "speculative execution" in which a processor executes multiple branch paths simultaneously, or predicts a branch, so that the processor can continue executing without waiting for the result of the branch operation. By reducing dependencies on branch conditions, speculative execution can increase the total number of instructions issued.

Unfortunately, conventional speculative execution typically provides a limited performance improvement because only a small number of instructions can be speculatively executed. One reason for this limitation is that conventional speculative execution is typically performed at the basic block level, and basic blocks tend to include only a small number of instructions. Another reason is that conventional hardware structures used to perform speculative execution can only accommodate a small number of speculative instructions.

What is needed is a method and apparatus that facilitates speculative execution of program instructions at a higher level of granularity so that many more instructions can be speculatively executed.

A significant performance drawback for high performance computer systems is the need to periodically perform "membar" operations in order to flush read and write requests from of a load store unit (LSU) out to memory. A membar operation is typically performed to ensure that a particular read operation does not overtake a preceding write operation by flushing a write buffer in the LSU before the read operation takes place. A membar operation may also be performed to ensure that a particular write operation does not overtake a preceding read operation by to flushing a read buffer in the LSU before the write operation takes place.

Note that using membar operations can adversely affect system performance because membar operations stall the processor while requests in the LSU are flushed. This introduces delay unnecessarily because it typically suffices to ensure that a particular read request does not overtake a particular write request. Hence, waiting until all requests are flushed out of the LSU is often unnecessary.

What is needed is a method and apparatus that enforces dependencies between memory references without incurring the delays inherent in membar operations.

SUMMARY

One embodiment of the present invention provides a system that enforces dependencies between memory references within a load store unit (LSU) in a processor. When a write request is received in the load store unit, the write request is loaded into a store buffer in the LSU. The write request may include a "watch address" specifying that a subsequent load from the watch address cannot occur before the write request completes. Note that the watch address is not necessarily the same as the destination address of the write operation. When a read request is received in the load store unit, the read request is loaded into a load buffer. The system determines if the read request is directed to the same address as a matching watch address in the store buffer. If so, the system waits for the write request associated with the matching watch address to complete before completing the read request.

In one embodiment of the present invention, if the read request is directed to the same address as a matching write request in the store buffer, the system completes the read request by returning a data value contained in the matching write request without going out to memory.

In one embodiment of the present invention, when the read request is directed to the same address as a matching watch address in the store buffer, the system stores an index with the read request in the load buffer. This index specifies a location of the associated write request in the store buffer.

In one embodiment of the present invention, the system provides an executable code write instruction that specifies the watch address.

BRIEF DESCRIPTION OF THE FIGURES

FIG. 7 is a flow chart illustrating operations involved in performing a write to a memory element by a head thread in accordance with an embodiment of the present invention.

FIG. 8 is a flow chart illustrating operations involved in performing a read to a memory element by a speculative thread in accordance with an embodiment of the present invention.

FIG. 9 is a flow chart illustrating operations involved in performing a write to a memory element by a speculative thread in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
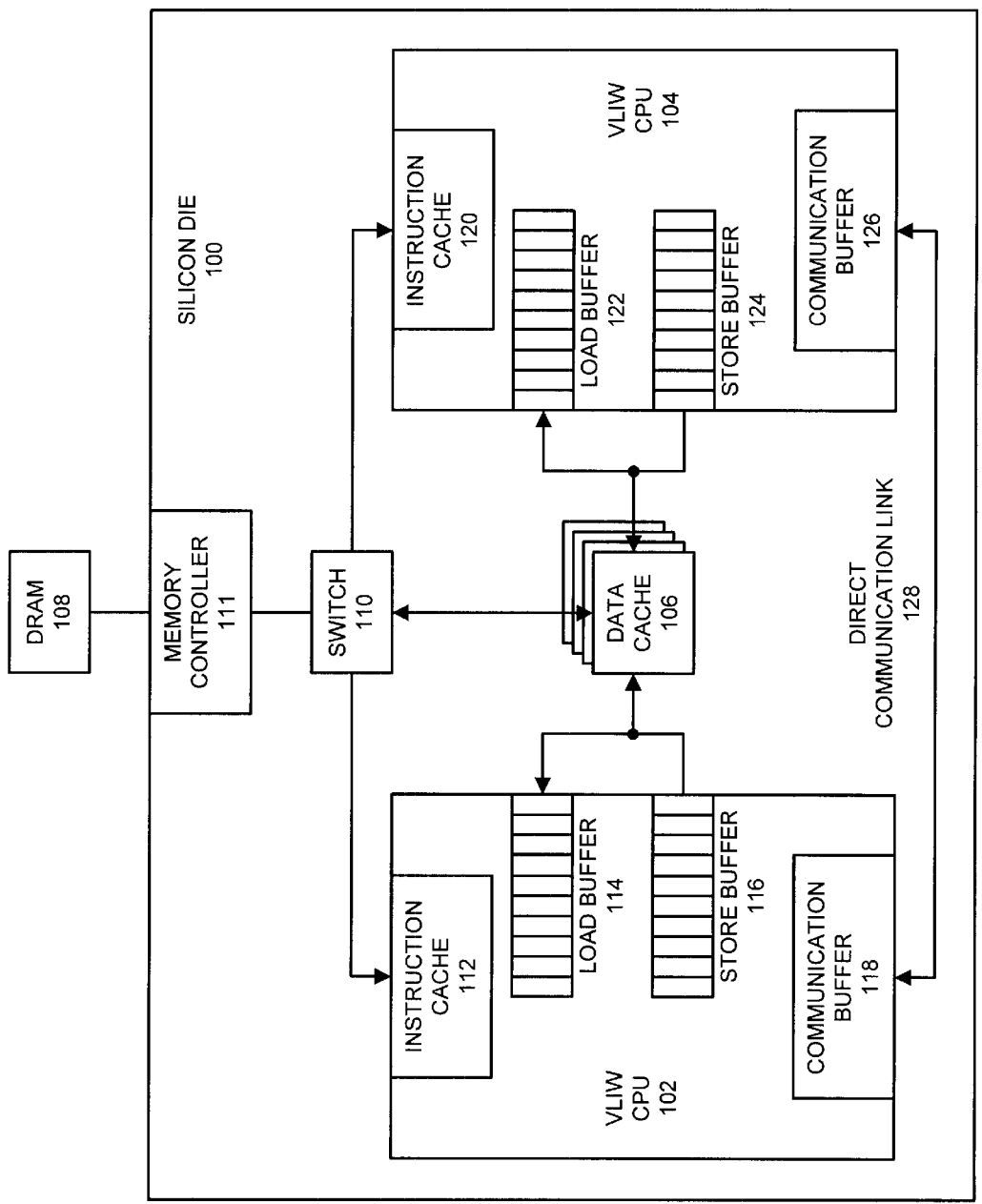
FIG. 1 illustrates a computer system including two central processing units sharing a common data cache in accordance with an embodiment of the present invention.

FIG. 1 illustrates a computer system including two central processing units (CPUs) 102 and 104 sharing a common data cache 106 in accordance with an embodiment of the present invention. In this embodiment, CPUs 102 and 104 and data cache 106 reside on silicon die 100. Note that CPUs 102 and 104 may generally be any type of computational devices that allow multiple threads to execute concurrently. In the embodiment illustrated in FIG. 1, CPUs 102 and 104 are very long instruction word (VLIW) CPUs, which support concurrent execution of multiple instructions executing on multiple functional units. VLIW CPUs 102 and 104 include instruction caches 112 and 120, respectively, containing instructions to be executed by VLIW CPUs 102 and 104.

VLIW CPUs 102 and 104 additionally include load buffers 114 and 122 as well as store buffers 116 and 124 for buffering communications with data cache 106. More specifically, VLIW CPU 102 includes load buffer 114 for buffering loads received from data cache 106, and store buffer 116 for buffering stores to data cache 106. Similarly, VLIW CPU 104 includes load buffer 122 for buffering loads received from data cache 106, and store buffer 124 for buffering stores to data cache 106.

VLIW CPUs 102 and 104 are additionally coupled together by direct communication link 128, which facilitates rapid communication between VLIW CPUs 102 and 104. Note that direct communication link 128 allows VLIW CPU 102 to write into communication buffer 126 within VLIW CPU 104. It also allows VLIW CPU 104 to write into communication buffer 118 within VLIW CPU 102.

In the embodiment illustrated in FIG. 1, Data cache 106 is fully dual-ported allowing concurrent read and/or write accesses from VLIW CPUs 102 and 104. This dual porting eliminates cache coherence delays associated with conventional shared memory architectures that rely on coherent caches.

In one embodiment of the present invention, data cache 106 is a 16K byte 4-way set-associative data cache with 32 byte cache lines.

Data cache 106, instruction caches 112 and instruction cache 120 are coupled through switch 110 to memory controller 111. Memory controller 111 is coupled to dynamic random access memory (DRAM) 108, which is located off chip. Switch 110 may include any type of circuitry for switching signal lines. In one embodiment of the present invention, switch 110 is a cross bar switch.

The present invention generally applies to any computer system that supports concurrent execution by multiple threads and is not limited to the illustrated computing system. However, note that data cache 106 supports fast accesses to shared data items. These fast accesses facilitate efficient sharing of status information between VLIW CPUs 102 and 104 to keep track of accesses to versions of memory objects.

Space-Time Dimensional Execution of Methods

Figure 2A:
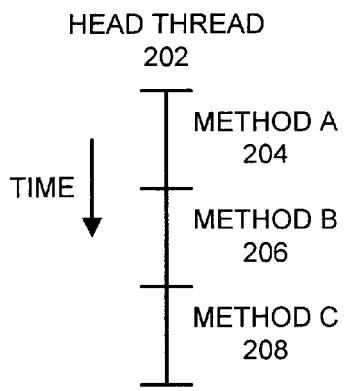
FIG. 2A illustrates sequential execution of methods by a single thread.

FIG. 2A illustrates sequential execution of methods in a conventional computer system by a single head thread 202. In executing a program, head thread 202 executes a number of methods in sequence, including method A 204, method B 206 and method C 208.

Figure 2B:
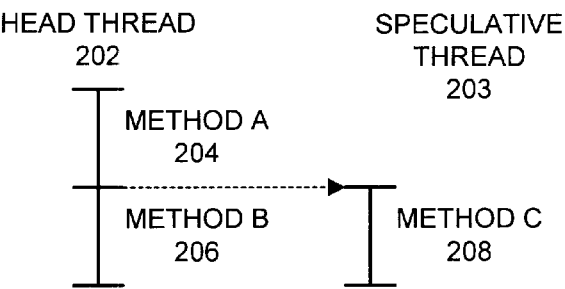
FIG. 2B illustrates space and time dimensional execution of a method in accordance with an embodiment of the present invention.

In contrast, FIG. 2B illustrates space and time dimensional execution of a method in accordance with an embodiment of the present invention. In FIG. 2B, head thread 202 first executes method A 204 and then executes method B 206. (For this example, assume that method B 206 returns a void or some other value that is not used by method C 208. Alternatively, if method C 208 uses a value returned by method B 206, assume that method C 208 uses a predicted return value from method B 206.)

As head thread 202 executes method B 206, speculative thread 203 executes method C 208 in a separate space-time dimension of the heap. If head thread 202 successfully executes method B 206, speculative thread 203 is joined with head thread 202. This join operation involves causing state associated with the speculative thread 203 to be merged with state associated with the head thread 202 and the collapsing of the space-time dimensions of the heap.

If speculative thread 203 for some reason encounters problems in executing method C 208, speculative thread 203 performs a rollback operation. This rollback operation allows speculative thread 203 to reattempt to execute method C 208. Alternatively, head thread 202 can execute method C 208 non-speculatively and speculative thread 203 can execute a subsequent method.

There are a number of reasons why speculative thread 203 may encounter problems in executing method C 208. One problem occurs when head thread 202 executing method B 206 writes a value to a memory element (object) after speculative thread 203 has read the same memory element. The same memory element can be read when the two space-time dimensions of the heap are collapsed at this memory element at the time of the read by speculative thread 203. In this case, speculative thread 203 should have read the value written by head thread 202, but instead has read a previous value. In this case, the system causes speculative thread 203 to roll back so that speculative thread 203 can read the value written by head thread 202.

Note that the term "memory element" generally refers to any unit of memory that can be accessed by a computer program. For example, the term "memory element" may refer to a bit, a byte or a word memory, as well as a data structure or an object defined within an object-oriented programming system.

Figure 3:
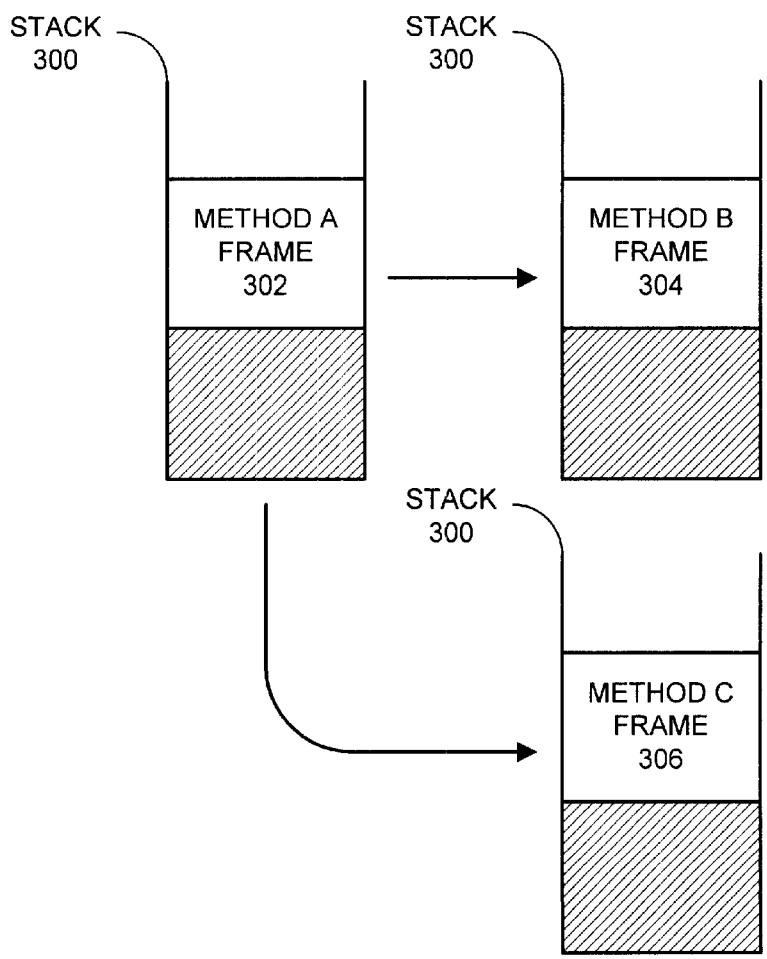
FIG. 3 illustrates the state of the system stack during space and time dimensional execution of a method in accordance with an embodiment of the present invention.

FIG. 3 illustrates the state of the system stack during space and time dimensional execution of a method in accordance with an embodiment of the present invention. Note that since programming languages such as the Java programming language do not allow a method to modify the stack frame of another method, the system stack will generally be the same before method B 206 is executed as it is before method C 208 is executed. (This is not quite true if method B 206 returns a parameter through the system stack. However, return parameters are can be explicitly dealt with as is described below.) Referring the FIG. 3, stack 300 contains method A frame 302 while method A 204 is executing. When method A 204 returns, method B 206 commences and method A frame 302 is replaced by method B frame 304. Finally, when method B 206 returns, method C 208 commences and method B frame 304 is replaced by method C frame 306. Note that since stack 300 is the same immediately before method B 206 executed as it is immediately before method C 208 is executed, it is possible to execute method C 208 using a copy of stack 300 without first executing method B 206.

In order to undo the results of speculatively executed operations, updates to memory need to be versioned. The overhead involved in versioning all updates to memory can be prohibitively expensive due to increased memory requirements, decreased cache performance and additional hardware required to perform the versioning.

Fortunately, not all updates to memory need to be versioned. For example, updates to local variables—such as a loop counter—on a system stack are typically only relevant to the thread that is updating the local variables. Hence, even for speculative threads versioning updates to these local variables is not necessary.

When executing programs written in conventional programming languages, such as C, it is typically not possible to determine which updates are related to the heap, and which updates are related to the system stack. These programs are typically compiled from a high-level language representation into executable code for a specific machine architecture. This compilation process typically removes distinctions between updates to heap and system stack.

The same is not true for new platform-independent computer languages, such as the JAVA™ programming language distributed by SUN Microsystems, Inc. of Palo Alto, Calif. (Sun, the Sun logo, Sun Microsystems, and Java are trademarks or registered trademarks of Sun Microsystems, Inc. in the United States and other countries.) A program written in the Java programming language is typically compiled into a class file containing Java byte codes. This class file can be transmitted over a computer network to a distant computer system to be executed on the distant computer system. Java byte codes are said to be "platform-independent," because they can be executed across a wide range of computing platforms, so long as the computing platforms provide a Java virtual machine.

A Java byte code can be executed on a specific computing platform by using an interpreter or a just in time (JIT) compiler to translate the Java bytecode into machine code for the specific computing platform. Alternatively, a Java byte code can be executed directly on a Java bytecode engine running on the specific computing platform.

Fortunately, a Java bytecode contains more syntactic information than conventional machine code. In particular, the Java bytecodes differentiate between accesses to local variables in the system stack and accesses to the system heap. Furthermore, programs written in the Java programming language do not allow conversion between primitive and reference types. Such conversion can make it hard to differentiate accesses to the system stack from accesses to the system heap at compile time.

Data Structures to Support Space-Time Dimensional Execution

Figure 4:
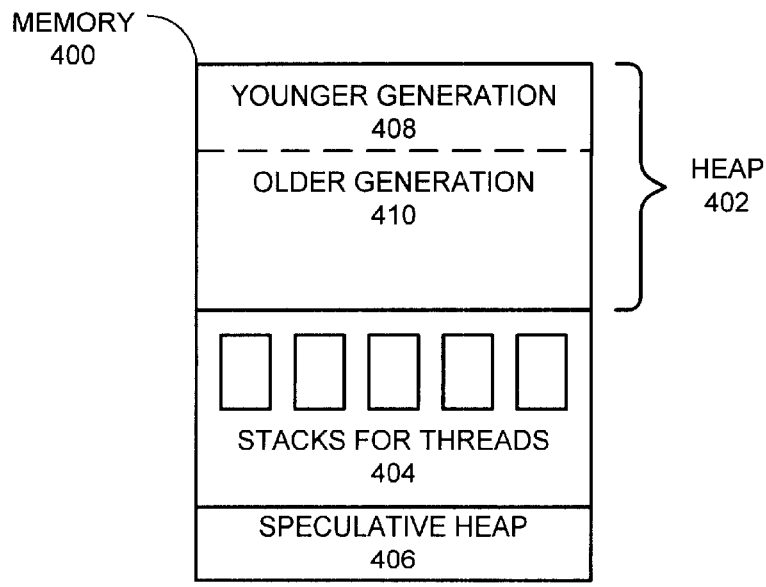
FIG. 4 illustrates how memory is partitioned between stack and heap in accordance with an embodiment of the present invention.
Figure 5:
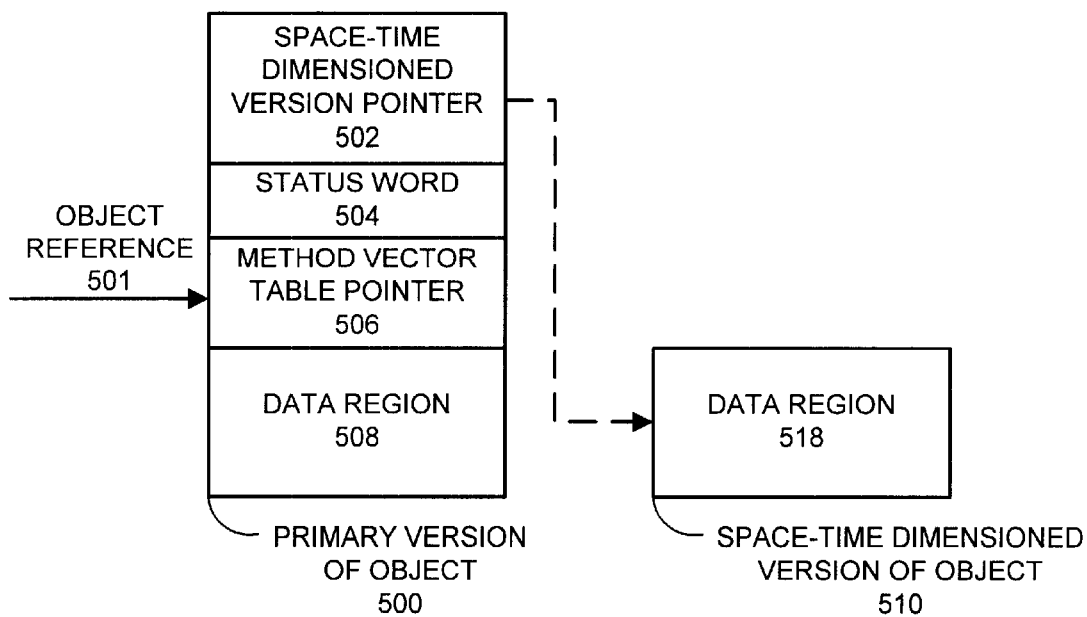
FIG. 5 illustrates the structure of a primary version and a space-time dimensioned version of an object in accordance with an embodiment of the present invention.

FIG. 4 illustrates how memory is partitioned between stack and heap in accordance with an embodiment of the present invention. In FIG. 4, memory 400 is divided into a number of regions including heap 402, stacks for threads 404 and speculative heap 406. Heap 402 comprises a region of memory from which objects are allocated. Heap 402 is further divided into younger generation region 408 and older generation region 410 for garbage collection purposes. For performance reasons, garbage collectors typically treat younger generation objects differently from older generation objects. Stack for threads 404 comprises a region of memory from which stacks for various threads are allocated. Speculative heap 406 contains the space-time dimensioned values of all memory elements where the two space-time dimensions of the heap are not collapsed. This includes space-time dimensional versions of objects, for example, version 510 of object 500 as shown in FIG. 5, and objects created by speculative thread 203. For garbage collection purposes, these objects created by speculative thread 203 can be treated as belonging to a generation that is younger than objects within younger generation region 408.

FIG. 5 illustrates the structure of a primary version of object 500 and a space-time dimensioned version of object 510 in accordance with an embodiment of the present invention.

Primary version of object 500 is referenced by object reference pointer 501. Like any object defined within an object-oriented programming system, primary version of object 500 includes data region 508,which includes one or more fields containing data associated with primary version of object 500. Primary version of object 500 also includes method vector table pointer 506. Method vector table pointer 506 points to a table containing vectors that point to the methods that can be invoked on primary version of object 500.

Primary version of object 500 also includes space-time dimensioned version pointer 502, which points to space-time dimensioned version of object 510, if the two space-time dimensions are not collapsed at this object. Note that in the illustrated embodiment of the present invention, space-time dimensioned version 510 is always referenced indirectly through space-time dimensioned version pointer 502. Primary version of object 500 additionally includes status word 504, which contains status information specifying which fields from data region 508 have been written to or read by speculative thread 203. Space-time dimensioned version of object 510 includes only data region 518.

Figure 6:
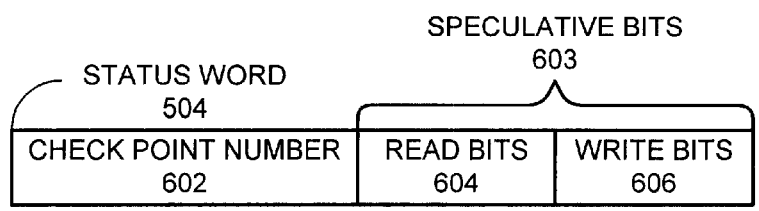
FIG. 6 illustrates the structure of a status word for an object in accordance with an embodiment of the present invention.

FIG. 6 illustrates the structure of status word 504 in accordance with an embodiment of the present invention. In this embodiment, status word 504 includes checkpoint number 602 and speculative bits 603. Speculative bits 603 includes read bits 604 and write bits 606. When status word 504 needs to be updated due to a read or a write by speculative thread 203, checkpoint number 602 is updated with the current time of the system. The current time in the time dimension of the system is advanced discretely at a join or a rollback. This allows checkpoint number 602 to be used as a qualifier for speculative bits 603. If checkpoint number 602 is less than the current time, speculative bits 603 can be interpreted as reset.

Read bits 604 keep track of which fields within data region 508 have been read since the last join or rollback. Correspondingly, write bits 606 keep track of which fields within data region 508 have been written since the last join or rollback. In one embodiment of the present invention, read bits 604 includes one bit for each field within data region 508. In another embodiment, read bits includes fewer bits than the number of fields within data region 508. In this embodiment, each bit within read bits 604 corresponds to more than one field in data region 508. For example, if there are eight read bits, each bit corresponds to every eighth field. Write bits 606 similarly can correspond to one or multiple fields within data region 508.

Space-Time Dimensional Update Process

Space-time dimensioning occurs during selected memory updates. For local variable and operand accesses to the system stack, no space-time dimensioned versions exist and nothing special happens. During read operations by head thread 202 to objects in the heap 402, again nothing special happens.

Special operations are involved in write operations by head thread 202 as well as read and write operations by speculative thread 203. These special operations are described in more detail with reference to FIGS. 7, 8 and 9 below.

FIG. 7 is a flow chart illustrating operations involved in a write operation to an object by a head thread 202 in accordance with an embodiment of the present invention. The system writes to the primary version of object 500 and the space-time dimensioned version of object 510 if the two space-time dimensions are not collapsed at this point (step 702). Next, the system checks status word 504 within primary version of object 500 to determine whether a rollback is required (step 704). A rollback is required if speculative thread 203 previously read the data element. The same memory element can be read when the two space-time dimensions of the heap are collapsed at this memory element at the time of the read by speculative thread 203. A rollback is also required if speculative thread 203 previously wrote to the object and thus ensured that the two dimensions of the object are not collapsed at this element, and if the current write operation updates both primary version of object 500 and space-time dimensioned version of object 510.

If a rollback is required, the system causes speculative thread 203 to perform a rollback operation (step 706). This rollback operation allows speculative thread 203 to read from (or write to) the object after head thread 202 writes to the object.

Note that in the embodiment of the present invention illustrated in FIG. 7 the system performs writes to both primary version 500 and space-time dimensioned version 510. In an alternative embodiment, the system first checks to determine if speculative thread 203 previously wrote to space-time dimensioned version 510. If not, the system writes to both primary version 500 and space-time dimensioned version 510. If so, the system only writes to primary version 500.

FIG. 8 is a flow chart illustrating operations involved in a read operation to an object by speculative thread 203 in accordance with an embodiment of the present invention. During this read operation, the system sets a status bit in status word 504 within primary version of object 500 to indicate that primary version 500 has been read (step 802). Speculative thread 203 then reads space-time dimensioned version 510, if it exists. Otherwise, speculative thread 203 reads primary version 500.

FIG. 9 is a flow chart illustrating operations involved in a write operation to a memory element by speculative thread 203 in accordance with an embodiment of the present invention. If a space-time dimensioned version 510 does not exist, the system creates a space-time dimensioned version 510 in speculative heap 406 (step 902). The system also updates status word 504 to indicate that speculative thread 203 has written to the object if such updating is necessary (step 903). The system next writes to space-time dimensioned version 510 (step 904). Such updating is necessary if head thread 202 must subsequently choose between writing to both primary version 500 and space-time dimensioned version 510, or writing only to primary version 500 as is described above with reference to FIG. 7.

Figure 10:
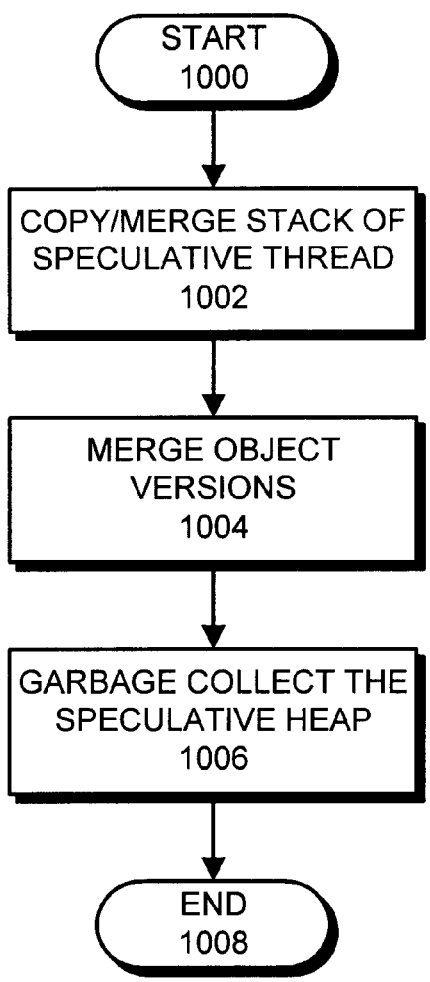
FIG. 10 is a flow chart illustrating operations involved in performing a join between a head thread and a speculative thread in accordance with an embodiment of the present invention.

FIG. 10 is a flow chart illustrating operations involved in a join operation between head thread 202 and a speculative thread 203 in accordance with an embodiment of the present invention. A join operation occurs for example when head thread 202 reaches a point in the program where speculative thread 203 began executing. The join operation causes state associated with the speculative thread 203 to be merged with state associated with the head thread 202. This involves copying and/or merging the stack of speculative thread 203 into the stack of head thread 202 (step 1002). It also involves merging space-time dimension and primary versions of objects (step 1004) as well as possibly garbage collecting speculative heap 406 (step 1006). In one embodiment of the present invention, one of threads 202 or 203 performs steps 1002 and 1006, while the other thread performs step 1004.

Figure 11:
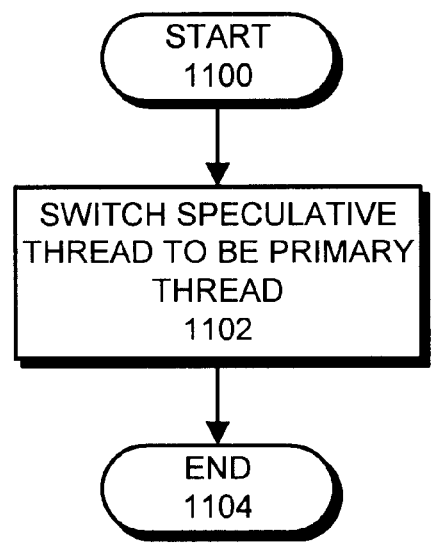
FIG. 11 is a flow chart illustrating operations involved in performing a join between a head thread and a speculative thread in accordance with another embodiment of the present invention.

FIG. 11 is a flow chart illustrating operations involved in a join operation between head thread 202 and a speculative thread 203 in accordance with another embodiment of the present invention. In this embodiment, speculative thread 203 carries on as a pseudo-head thread. As a pseudo-head thread, speculative thread 203 uses indirection to reference space-time dimensioned versions of objects, but does not mark objects or create versions. While speculative thread 203 is acting as a pseudo-head thread, head thread 202 updates primary versions of objects.

Extension to Additional Speculative Threads

Although the present invention has been described for the case of a single speculative thread, the present invention can be extended to provide multiple speculative threads operating on multiple space-time dimensioned versions of a data object in parallel.

Enforcing Memory Reference Dependencies in a Load Store Unit

One complication in implementing the above-described system is that it is often necessary to ensure that a write operation occurs before a read operation. For example, the write operation in step 702 of FIG. 7 must complete before the read operation in step 704 completes for head thread 202. In another example, the write operation in step 802 of FIG.

8 must complete before the read operation in step 804 completes for speculative thread 203. These requirements are complicated by the fact that queuing delays through load buffer 114 and store buffer 116 in FIG. 1 may cause a read operation to complete before a preceding write operation completes. One way to ensure proper ordering of write and read operations is to insert a "membar" operation between the write and read instructions to ensure that the write instruction is committed to memory before the read instruction is executed. Unfortunately, as mentioned above, using a membar instruction tends to unnecessarily degrade system performance.

In order to remedy this performance problem, one embodiment of the present invention provides special read and write instructions that specify memory reference dependencies. The special write operation has the following form:

WRITE<address><value><watch address>

Like a conventional write instruction, the address specifies a target address for the write instruction and the value specifies a value to be written to the target address. Unlike a conventional write instruction, the special write instruction includes a "watch address". The watch address specifies that a subsequent read request directed to the watch address cannot overtake the write request generated by the write instruction. One embodiment of the present invention enforces this dependency and is described below with reference to FIGS. 12 and 13.

The special read operation has the following form:

READ<address><dest. register><watch address>

Like a conventional read instruction, the address specifies a target address for the read instruction and the destination register index specifies a destination register for storing a data value retrieved by the read operation. Unlike a conventional read instruction, the special read instruction includes a "watch address". This watch address specifies that a subsequent write operation directed to the watch address cannot overtake the read request generated by the special read instruction. One embodiment of the present invention enforces this dependency and is described below with reference to FIGS. 14 and 15.

In another embodiment of the present invention, the special read operation and the special write operation include four register specifiers instead of three. In this embodiment, the single <address> register specifier of the above instructions is replaced with a <base> register specifier and an <offset> register specifier. In this case, the address for the special read operation or the special write operation is formed by adding the offset register to the base register.

Figure 12:
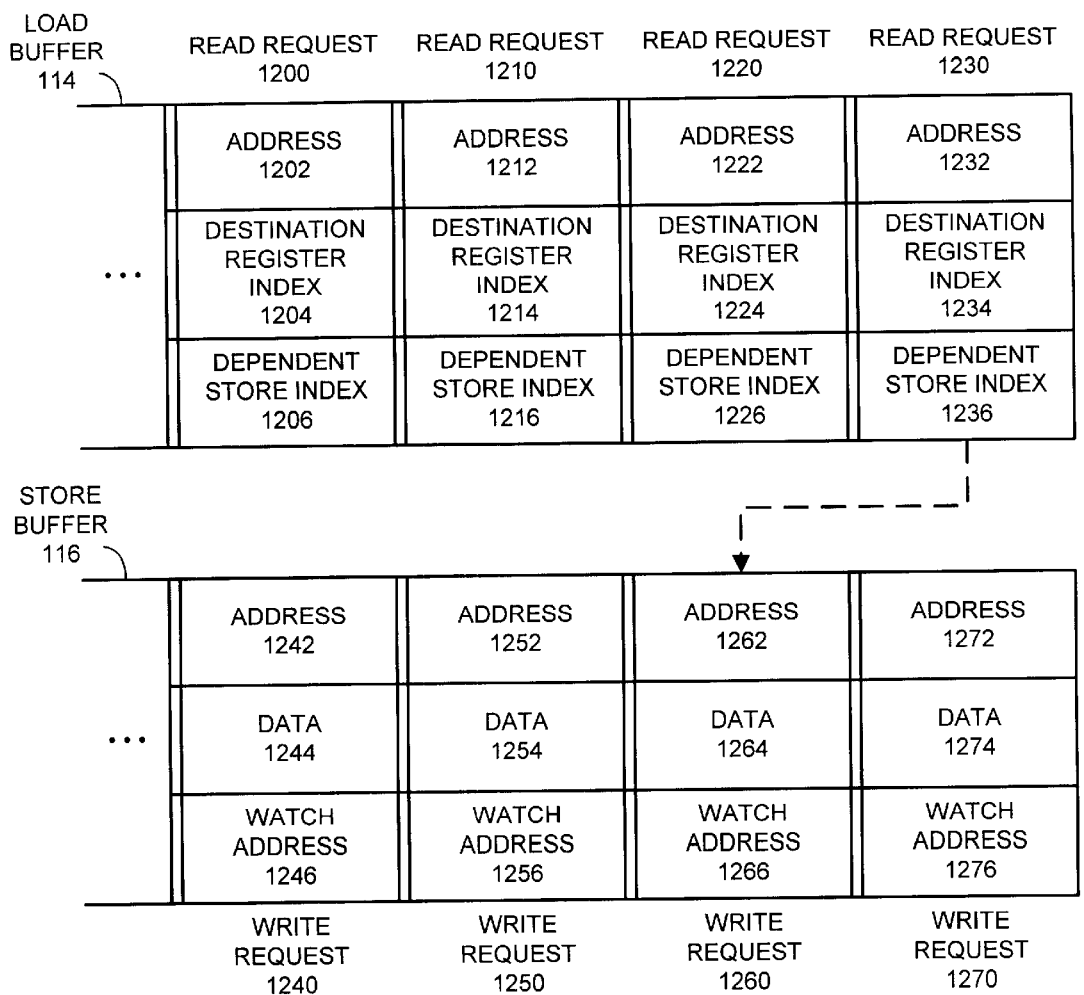
FIG. 12 illustrates a load store unit that is configured to prevent a read request from overtaking a preceding write request in accordance with an embodiment of the present invention.

FIG. 12 illustrates a load store unit that is configured to prevent a read request from overtaking a preceding write request in accordance with an embodiment of the present invention. The load store unit illustrated in FIG. 12 includes load buffer 114 containing read (load) requests for read operations, and store buffer 116 containing write (store) requests for write operations (see FIG. 1).

Load buffer 114 includes a number of entries for storing read requests that are in transit between processor and memory. More specifically, load buffer 114 contains read requests 1200, 1210, 1220 and 1230. As in a conventional computer system, each read request includes an address that is the target of the read request, and an index for a destination register into which the data obtained during the read request is stored. More specifically, read request 1200 includes address 1202 and destination register index 1204; read request 1210 includes address 1212 and destination register index 1214; read request 1220 includes address 1222 and destination register index 1224; and read request 1230 includes address 1232 and destination register index 1234.

In addition to address and destination register index fields, each entry in load buffer 114 also includes a dependent store index. More specifically, read requests 1200, 1210, 1220 and 1230 include dependent store indices 1206, 1216, 1226 and 1236, respectively. Each dependent store index specifies an entry within store buffer 116 that contains a write request that has a watch address that matches the address of the read request. For example, dependent store index 1236 for read request 1230 references write request 1250 within store buffer 116. This indicates that watch address 1256 within write request 1250 matches address 1232 within read request 1230. Hence, read request 1230 should not overtake write request 1250.

Store buffer 116 includes a number of entries for storing write requests that are in transit between processor and memory. More specifically, store buffer 116 contains write requests 1240, 1250, 1260 and 1270. As in a conventional computer system, each write request includes an address that is the target of the write request, and a data value to be stored at the target address. More specifically, write request 1240 includes address 1242 and data 1244; write request 1250 includes address 1252 and data 1254; write request 1260 includes address 1262 and data 1264; and write request 1270 includes address 1272 and data 1274.

In addition to address and data fields, each entry in store buffer 116 also includes a watch address. More specifically, write requests 1240, 1250, 1260 and 1270 include watch addresses 1246, 1256, 1266 and 1276, respectively. Each watch address specifies that a subsequent load from the watch address cannot occur before the associated write request completes. Hence, a subsequent load from the watch address may have to wait until the associated write request completes.

Note that some conventional load store units include circuitry to compare an address with address fields 1242, 1252, 1262 and 1272. This same circuitry can be applied to search for a match between the address of a read request and one of watch addresses 1246, 1256, 1266 and 1276.

Figure 13:
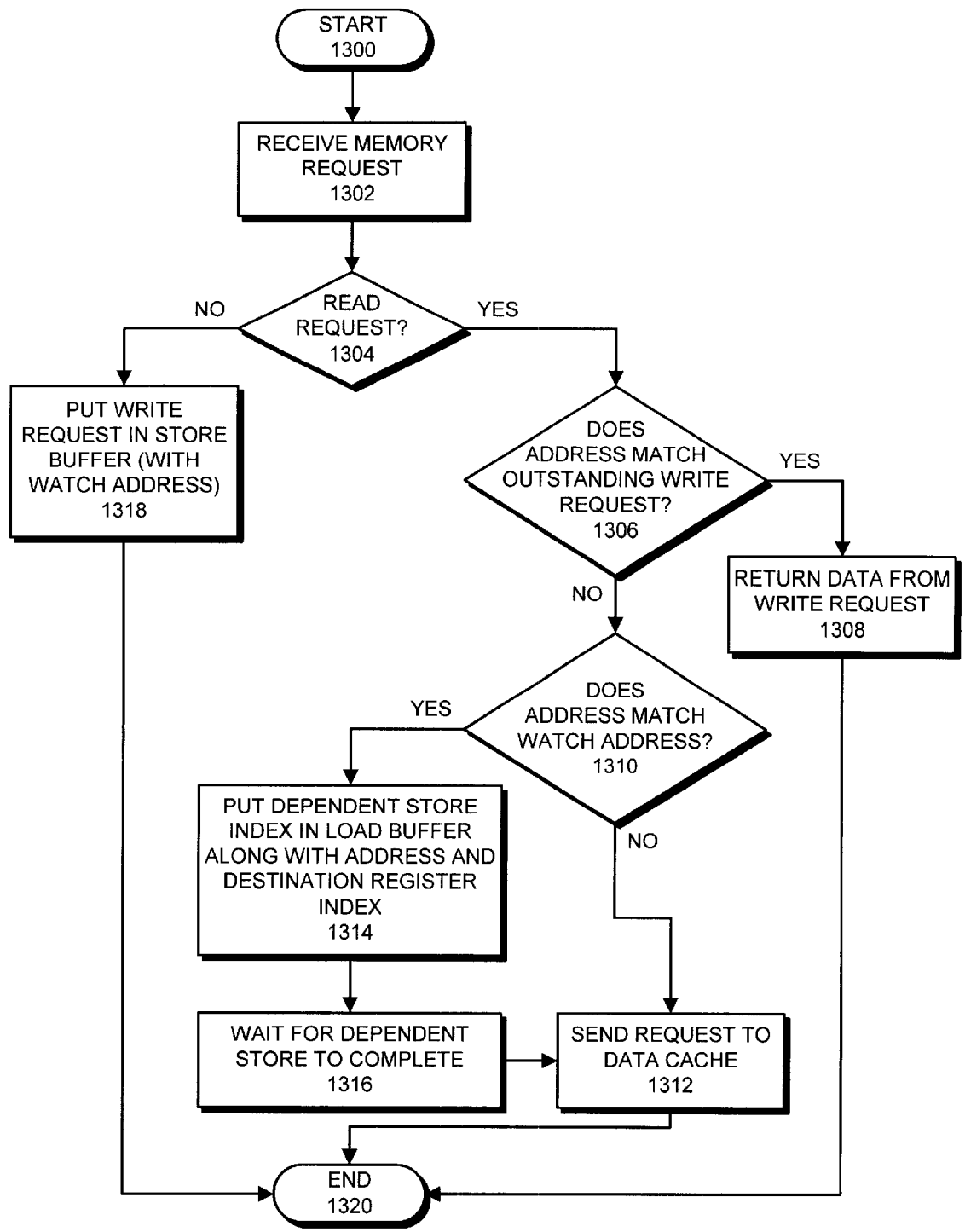
FIG. 13 is a flow chart that illustrates how the system ensures that a read request does not overtake a preceding write request in accordance with an embodiment of the present invention.

FIG. 13 is a flow chart illustrating how the system ensures that a read request does not overtake a preceding write request in accordance with an embodiment of the present invention. The system first receives a memory request (step 1302) and determines if the memory request is a read request or a write request (step 1304). If the request is a write request, the system enters the write request into store buffer 116 along with any watch address that may accompany the write request (step 1318). Note that only write requests that result from the special write instruction described above will include a watch address. Other write requests will simply store a NULL value (such as −1) into the watch address field.

If the request is a read request, the system determines if the read request is directed to the same address as any outstanding write request in store buffer 116 (step 1306). If so, the system simply returns data from the write request to complete the read operation without having to go out to memory (step 1308). If not, the system determines if the address of the read request matches any watch address from store buffer 116 (step 1310). If not, the system sends the read request to data cache 106 from FIG. 1 (step 1312). Note that this may involve storing the read request into load buffer 114 until the read request can be sent to data cache 116.

If the address of the read request matches a watch address, the read request is loaded into load buffer 114 along with a dependent store index specifying an entry in store buffer 116 that contains the matching watch address (step 1314). For example, in FIG. 12, address 1232 from read request 1230 matches watch address 1256 from write request 1250. Hence, dependent store index 1236 points to the location of write request 1250 in store buffer 116. Next, the system waits for the dependent store to complete (step 1316) before sending the read request to data cache 106 (step 1312).

Figure 14:
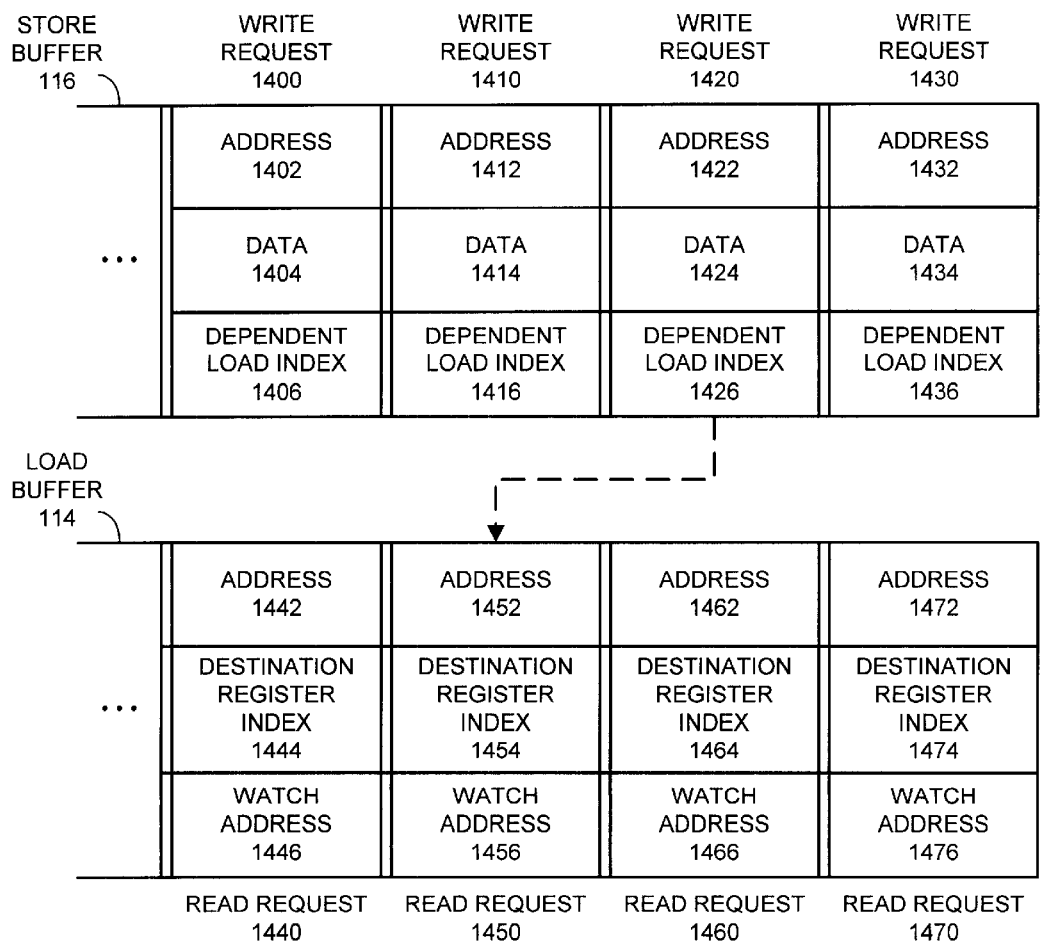
FIG. 14 illustrates a load store unit that is configured to prevent a write request from overtaking a preceding read request in accordance with an embodiment of the present invention.

FIG. 14 illustrates a load store unit that is configured to prevent a write request from overtaking a preceding read request in accordance with an embodiment of the present invention. The load store unit illustrated in FIG. 14 includes load buffer 114 for storing read (load) requests for read operations, and store buffer 116 for storing write (store) requests for write operations (see FIG. 1).

Load buffer 114 includes a number of entries for storing read requests that are in transit between processor and memory. More specifically, load buffer 114 contains read requests 1440, 1450, 1460 and 1470. As in a conventional computer system, each read request includes an address that is the target of the read request, and an index for a destination register into which data obtained during the read request is stored. More specifically, read request 1440 includes address 1442 and destination register index 1444; read request 1450 includes address 1452 and destination register index 1454; read request 1460 includes address 1462 and destination register index 1464; and read request 1470 includes address 1472 and destination register index 1474.

In addition to address and destination register index fields, each entry in load buffer 114 also includes a watch address. More specifically, read requests 1440, 1450, 1460 and 1470 include watch addresses 1446, 1456, 1456 and 1476, respectively. Each watch address specifies that a preceding store to the watch address cannot occur before the associated read request completes. Hence, a store from the watch address may have to wait until the associated read request completes.

Store buffer 116 includes a number of entries for storing write requests that are in transit between processor and memory. More specifically, store buffer 116 contains write requests 1400, 1410, 1420 and 1430. As in a conventional computer system, each write request includes an address that is the target of the write request, and a data value to be stored at the target address. More specifically, write request 1400 includes address 1402 and data 1404; write request 1410 includes address 1412 and data 1414; write request 1420 includes address 1422 and data 1424; and write request 1430 includes address 1432 and data 1434.

In addition to address and data fields, each entry in store buffer 116 also includes a dependent load index. More specifically, write requests 1400, 1410, 1420 and 1430 include dependent load indices 1406, 1416, 1426 and 1436, respectively. Each dependent load index specifies an entry within load buffer 114 containing a read request that has a watch address that matches the address of the write request. For example, dependent load index 1426 in write request 1420 references read request 1450 within store buffer 116. This indicates that watch address 1456 within read request 1450 matches address 1422 within write request 1420. Hence, write request 1420 should not overtake read request 1450.

Figure 15:
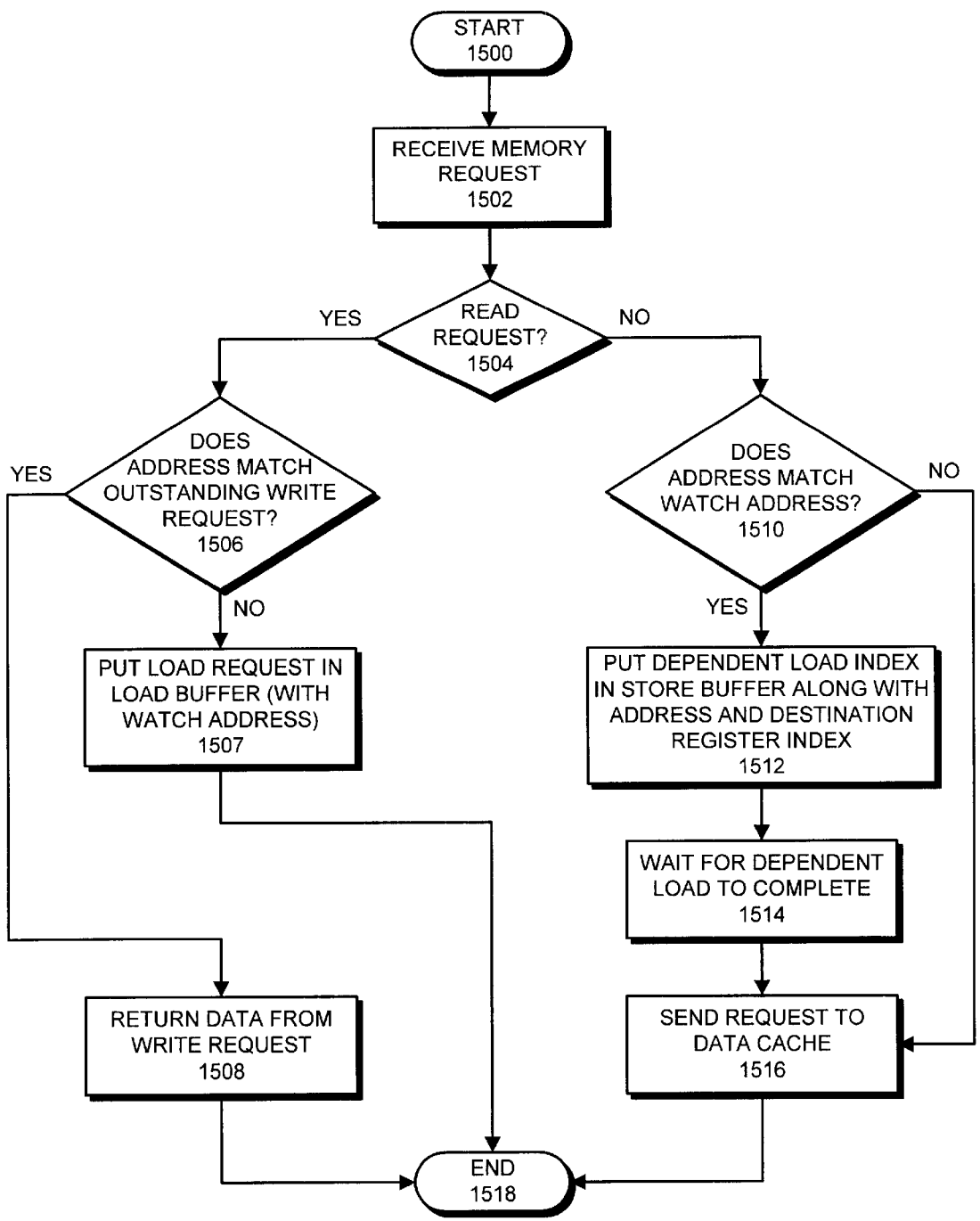
FIG. 15 is a flow chart that illustrates how the system ensures that a write request does not overtake a preceding read request in accordance with an embodiment of the present invention.

FIG. 15 is a flow chart that illustrates how the system ensures that a write request does not overtake a preceding read request in accordance with an embodiment of the present invention. The system first receives a memory request (step 1502) and determines if the memory request is a read request or a write request (step 1504). If the request is a read request, the system determines if the read request is directed to the same address as any outstanding write request in store buffer 116 (step 1506). If so, the system simply returns data from the write request to complete the read request without having to go out to memory (step 1508). If not, the system enters the read request into load buffer 114 along with any watch address that may accompany the read request (step 1507). Note that. only read requests that originate from the special write instruction described above include a watch address. Other read requests simply store a NULL value (such as −1) into the watch address field.

If the request is a write request, the system determines if the address of the write request matches any watch address from load buffer 114 (step 1510). If not, the system sends the write request to data cache 106 from FIG. 1 (step 1516). Note that this may involve storing the write request in store buffer 116 until the write request can be processed.

If the address of the write request matches a watch address, the write request is loaded into store buffer 116 along with a dependent load index specifying the entry in load buffer 114 that contains the matching watch address (step 1512). For example, in FIG. 14, address 1422 in write request 1420 matches watch address 1456 from read request 1450. Hence, dependent load index 1426 points to the location of read request 1450 in load buffer 114. Next, the system waits for the dependent store to complete (step 1514) before sending the read request to data cache 106 (step 1516).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for enforcing dependencies between memory references in a load store unit, the load store unit including a load buffer for storing read requests and a store buffer for storing write requests between a processor and a memory, the method comprising:

receiving a memory request in the load store unit;

if the memory request is a write request,
  storing the write request in the store buffer, and
  if the write request is associated with a watch address, storing the watch address in the store buffer, the watch address specifying that a subsequent load from the watch address cannot occur before the associated write request completes, wherein the watch address can refer to a memory location other than a target memory location for the write request; and if the memory request is a read request,
  storing the read request in the load buffer, and
  if the read request is directed to the same address as a matching watch address in the store buffer, waiting for a write request associated with the matching watch address to complete before completing the read request, wherein the watch address can refer to a memory location other than a target memory location for the read request.

2. The method of claim 1, further comprising if the memory request is a read request, and if the read request is directed to the same address as a matching write request in the store buffer, completing the read request by returning a data value contained in the matching write request.

3. The method of claim 1, further comprising processing write requests in the store buffer in first in first out order by sending the write requests to the memory.

4. The method of claim 1, further comprising processing read requests in the load buffer in first in first out order by sending the read requests to the memory.

5. The method of claim 1, wherein waiting for the write request associated with the matching watch address to complete includes storing an index along with the read request in the load buffer, the index specifying a location of the associated write request in the store buffer.

6. The method of claim 1, wherein storing the write request in the store buffer includes storing a destination address and a data value in the store buffer.

7. The method of claim 1, wherein storing the read request in the load buffer includes storing a source address and a specifier for a destination register in the load buffer.

8. The method of claim 1, further comprising providing an executable code write instruction that specifies the watch address.

9. A method for enforcing dependencies between memory references in a load store unit, the load store unit including a load buffer for storing read requests and a store buffer for storing write requests between a processor and a memory, the method comprising:
  providing an executable code write instruction that includes a watch address, the watch address specifying that a subsequent load from the watch address cannot occur before the associated write request completes;
  receiving a memory request in the load store unit;
  if the memory request is a write request,
    storing the write request in the store buffer, wherein the write request includes a destination address and a data value, and
    if the write request is associated with a watch address, storing the watch address in the store buffer, wherein the watch address can refer to a memory location other than a target memory location for the write request;
  if the memory request is a read request,
    if the read request is directed to the same address as a matching write request in the store buffer, completing the read request by returning a data value contained in the matching write request,
    storing the read request in the load buffer, wherein the read request includes a source address and a specifier for a destination register, and
    if the read request is directed to the same address as a matching watch address in the store buffer, waiting for a write request associated with the matching watch address to complete before completing the read request, wherein the watch address can refer to a memory location other than a target memory location for the read request;
  processing write requests in the store buffer in first in first out order by sending the write requests to the memory; and
  processing read requests in the load buffer in first in first out order by sending the read requests to the memory.

10. A method for enforcing dependencies between memory references in a load store unit, the load store unit including a load buffer for storing read requests and a store buffer for storing write requests between a processor and a memory, the method comprising:
  receiving a memory request in the load store unit;
  if the memory request is a read request,
    storing the read request in the load buffer, and
    if the read request is associated with a watch address, storing the watch address in the load buffer, the watch address specifying that a store to the watch address cannot occur before the associated read request completes, wherein the watch address can refer to a memory location other than a target memory location for the write request; and
  if the memory request is a write request,
    storing the write request in the store buffer, and
    if the write request is directed to the same address as a matching watch address in the load buffer, waiting for a read request associated with the matching watch address to complete before completing the write request, wherein the watch address can refer to a memory location other than a target memory location for the read request.

11. The method of claim 10, further comprising if the memory request is the read request, and if the read request is directed to the same address as a matching write request in the store buffer, completing the read request by returning a data value contained in the matching write request.

12. The method of claim 10, wherein waiting for the read request associated with the matching watch address to complete includes storing an index along with the write request in the store buffer, the index specifying a location of the associated read request in the load buffer.

13. The method of claim 10, wherein storing the write request in the store buffer includes storing a destination address and a data value in the store buffer.

14. The method of claim 10, wherein storing the read request in the load buffer includes storing a source address and a specifier for a destination register in the load buffer.

15. The method of claim 10, further comprising providing an executable code read instruction that specifies the watch address.

16. An apparatus for enforcing dependencies between memory references, comprising:
  a processor;
  a load buffer within the processor for storing read requests between the processor and a memory;
  a store buffer within the processor for storing write requests between the processor and the memory;
  wherein each entry in the store buffer includes space for storing a write request and a watch address that is associated with the write request, the watch address specifying that a subsequent load from the watch address cannot occur before the associated write request completes, wherein the watch address can refer to a memory location other than a target memory location for the write request; and
  a waiting mechanism, that includes comparators to determine if a read request is directed to the same address as a matching watch address in the store buffer, and if so to wait for a write request associated with the matching watch address to complete before completing the read request, wherein the watch address can refer to a memory location other than a target memory location for the read request.

17. The apparatus of claim 16, further comprising a read request bypass mechanism, that uses a comparator to determine if the read request is directed to the same address as a matching write request in the store buffer, and if so, to complete the read request by returning a data value contained in the matching write request.

18. The apparatus of claim 16, further comprising a write request processing mechanism that is configured to process write requests in the store buffer in first in first out order by sending the write requests to the memory.

19. The apparatus of claim 16, further comprising a read request processing mechanism that is configured to process read requests in the load buffer in first in first out order by sending the read requests to the memory.

20. The apparatus of claim 16, wherein the load buffer includes an index along with a given read request in the load buffer, the index specifying a location of an associated write request in the store buffer that must complete before the given read request can complete.

21. The apparatus of claim 16, wherein each entry in the store buffer includes space for storing a destination address and a data value for an associated write request.

22. The apparatus of claim 16, wherein each entry in the load buffer includes space for storing a source address and a specifier for a destination register for an associated read request.

23. The apparatus of claim 16, wherein the processor is configured to execute a write instruction that specifies the watch address.

24. A computer readable storage medium storing a computer executable instruction, the computer executable instruction comprising:

an instruction specifier specifying that the instruction is a write operation;

a value specifier specifying a value to be written during the write operation;

an address specifier specifying an address that the value is to be written to during the write operation; and a watch address specifier specifying a watch address, the watch address indicating that a subsequent load from the watch address cannot occur before the write operation completes, wherein the watch address can refer to a memory location other than a target memory location for the write operation.

25. A computer readable storage medium storing a computer executable instruction, the computer executable instruction comprising:

an instruction specifier specifying that the instruction is a read operation;

a destination register specifier specifying a destination for a value returned during the read operation;

an address specifier specifying an address that the value is to be read from to during the read operation; and a watch address specifier specifying a watch address, the watch address indicating that a subsequent write operation directed to the watch address cannot overtake the read operation, wherein the watch address can refer to a memory location other than a target memory location for the read operation.

* * * * *